United States Patent [19]
Jabs

[11] Patent Number: 4,953,290
[45] Date of Patent: Sep. 4, 1990

[54] METHOD OF CONNECTING HEAT EXCHANGE TUBES TO A FLUID CONVEYING DUCT

[75] Inventor: Alfred Jabs, Groebenzell, Fed. Rep. of Germany

[73] Assignee: MTU Motoren- und Turbinen-Union Munchen GmbH, Munich, Fed. Rep. of Germany

[21] Appl. No.: 385,012

[22] Filed: Jul. 25, 1989

[30] Foreign Application Priority Data

Jul. 27, 1988 [DE] Fed. Rep. of Germany ....... 3825486

[51] Int. Cl.$^5$ .............................................. B21D 53/02
[52] U.S. Cl. ........................... 29/890.043; 29/890.054; 228/183
[58] Field of Search .................... 29/157.3 R, 157.3 C, 29/157.4 R, 445, 455.1, 458, 464, 514, 527.2, 530, 726.5; 228/183, 212, 215, 248, 252

[56] References Cited

U.S. PATENT DOCUMENTS

| | | | |
|---|---|---|---|
| 1,355,980 | 10/1920 | Jones | 29/157.3 R |
| 2,443,574 | 6/1948 | Burns | 228/212 |
| 2,974,404 | 3/1961 | Hunirih et al. | 29/157.3 R |
| 3,409,969 | 11/1968 | Simons et al. | 29/157.3 R |
| 3,551,995 | 1/1971 | Marichal | 228/215 |
| 4,488,342 | 12/1984 | Dangirder | 228/183 |
| 4,867,412 | 9/1989 | Greune | 29/157.3R |

FOREIGN PATENT DOCUMENTS

| | | |
|---|---|---|
| 3146090 | 5/1983 | Fed. Rep. of Germany . |
| 3324915 | 3/1984 | Fed. Rep. of Germany . |
| 3310061 | 5/1984 | Fed. Rep. of Germany . |
| 0091855 | 8/1976 | Japan ................... 228/248 |
| 0582926 | 12/1977 | U.S.S.R. ............. 228/248 |

*Primary Examiner*—Howard N. Goldberg
*Assistant Examiner*—Irene Cuda
*Attorney, Agent, or Firm*—Ladas & Parry

[57] ABSTRACT

A method of securing in fluid tight relation the spaced ends of straight legs of heat exchange tubes of a U-shaped matrix to a tubular fluid conveying duct is effected by bending the spaced ends of the straight legs of the matrix to reduce the spacing between the ends of the tubes, thereafter loosely gathering the ends of the tubes to bring them into contact along their surfaces and then encircling the loosely gathered tube ends with frame elements which apply compression forces to the tube ends to deform then and cause them to come into contact with one another over substantially the entire surface areas thereof. The tube ends are then heated to braze them together and unite them with the frame elements as a unified block assembly. The block assembly is then inserted into an opening of conforming shape in the tubular fluid conveying duct and joined to the duct in sealed relation.

15 Claims, 3 Drawing Sheets

METHOD OF CONNECTING HEAT EXCHANGE TUBES TO A FLUID CONVEYING DUCT

FIELD OF THE INVENTION

The invention relates to a method of connecting the ends of U-shaped heat exchange tubes to a fluid conveying duct in sealed relation.

DESCRIPTION OF PRIOR ART

A heat exchanger is disclosed in DE-OS No. 3146090 which comprises two parallel ducts for conveying compressed air to which are connected U-shaped heat exchange tubes of a tube matrix. The heat exchange tubes are of elliptical cross section. The tube matrix is externally traversed by hot gases to heat compressed air supplied to the tubes by one duct and the heated compressed air is then supplied to the other duct from which the heated compressed air is supplied to a suitable utilization means, such as the combustion chamber of a gas turbine engine.

In heat exchangers of this type, the ends of the heat exchange tubes must be connected to the ducts in sealed relation to provide operational safety. It is known to provide the ducts with a large number of holes in which the ends of the heat exchange tubes are inserted and welded or brazed to the ducts. This method of connection involves a comparatively great manufacturing effort, since the individual tube ends require connection to the perforated ducts by a comparatively large number of operations requiring skilled high-precision workmanship.

The brazed connections involve a risk factor that heretobefore has practically been impossible to eliminate, for the reason that relatively large braze clearances and joints are essential for the proper transport of the liquid braze alloy. This has the disadvantage that molten, liquid braze alloy can flow from the joint region so that during the subsequent cooling process there is no guarantee that the respective braze joints are completely filled with braze alloy over their entire circumference. This has an adverse effect on the necessary sealing integrity and strength of the connection. However, a relatively great thickness of braze alloy also has an adverse effect on the corrosion behavior of the joint. Even when using conventional electron beam-welding, the strength of the joints is likely to be relatively low, due to the notch effect at the respective joints of the tubes with the duct.

A method is disclosed in DE-OS No. 3310061 for manufacturing a duct or a heat exchanger block in which a perforated end plate of the heat exchanger or the perforated duct is comprised of a plurality of extremely accurately preformed or precontoured elements, which, in accordance with the number and desired spacing of the ends of the heat exchange tubes of the matrix, are joined layer after layer such that they each envelope one half of each of the ends of the heat exchange tubes of the matrix. This construction has the disadvantage that despite relatively accurate manufacture of the elements forming the layers, allowance must be made for manufacturing variations such that the total length of the end plate or duct to be manufactured varies with the accumulated thickness tolerance of the elements; apart from variations in length of end plates and ducts, the construction must take into account hole offset with regard to the normal spacing and arrangement of the ends of the tubes; the stringent requirements regarding the shape of the elements make it basically impossible to prevent production variation which is impractical or comparatively costly to correct. In combination with the layer-by-layer manufacture of end plates or ducts, the manufacturing cost is rather high. The hole offset and variations in the shape of the hole, no matter how small, require painstaking precision adjustment or centering of the respective tube ends of the matrix, where subsequent brazing of the tube ends to the respective end plate or duct wall requires an extremely accurate fit of the tube ends to prevent the braze alloy from locally flowing away from the joint to result in sealing and strength problems.

In a method disclosed in DE-PS No. 3324915 for manufacturing a heat exchanger block, the heat exchange tubes are inserted in predefined openings in a hollow mold filled with sinterable powder metal. After the sintering process, the powder metal forms a wall section of the duct in which the tube ends are fixedly integrated in a fluid-tight fit.

A significant disadvantage of this method is that the hollow mold merely establishes a boundary surface of the wall section to be formed, and the wall thickness is determined by the filing volume of the powder. It is therefore difficult to keep wall thickness tolerances small. The problem is also aggravated by the tightly packed arrangement of the plurality of heat exchange tubes. Also, sintering is an erratic process and the method is not especially feasible and is relatively cost.

U.S. Pat. No. 4,206,806 discloses a bilaterally locating retaining means to secure a straight nest of tubes of identical elliptical section to frame parts, and the tubes are formed with rectangular ends which may be twisted, for example, 90° relative to the position of the respective major axis of an elliptical section. In this embodiment, the tubes are directly welded together in line one after the other along the narrow faces of the rectangular tube ends and are welded to deformable strips along associated root sections of maximum overall length; in this arrangement the tubes are not locally fixedly integrated into the frame elements; rather, the frame elements are intended to provide for thermally compatible positioning of the respective tube ends. In a further embodiment, all rectangular tube ends are first welded together along common mating surfaces and then are retained in place in an opening in a frame or container. In the final analysis, then, this patent does not resolve the problem of having to anchor the ends of a tube assembly to the end plate of a heat exchanger or to the wall of a duct of a cross-counterflow heat exchanger to form a fixed, structurally stable and fluid-tight connection.

SUMMARY OF THE INVENTION

An object of the present invention is to provide a method of securing the ends of the heat exchange tubes of a heat exchanger to the wall of a duct simply, safely and in fluid tight relation through the intermediary of a block assembly.

In accordance with the invention, the spaced ends of the straight legs of the heat exchange tubes are bent to reduce the spacing between these ends. The ends are then loosely gathered to come into contact along their outer surfaces. The contacting ends of the tubes are encircled by frame elements to which compression forces are applied to deform the tube ends and cause them to come into contact with one another over substantially the entire surface areas thereof. The tube ends are then heated to braze them together and to unite the tube ends with the frame elements as a unified block assembly. The unified block assembly is inserted into an opening of corresponding shape in a tubular fluid conveying duct. The unified block assembly is then joined to the duct in sealed relation.

In this fashion, a fixedly nested, fluid-tight assembly of the tube ends can be connected to the duct in a simple manner, eliminating the need for complex and elaborate individual hole drilling and tube insertion processes, while also eliminating the brazing problems associated with the state of the art. The invention provides a structurally inherently stable tube connection; the block assembly connection of the tubes to the duct ensures operationally optimally safe retention of the elliptical tube ends of the tube matrix so that the tube matrix extends as a U-shaped array from the ducts into the path of flow of the hot gases. As regards the manner of mounting the individual tube ends to an end plate of a heat exchanger rather than to a duct, the inventive concept eliminates any need whatever to allow for a predefined closeness of special-section tube end spacing. By bending the tubes in accordance with the present invention from a region of "normal" closeness of tube spacing (the spacing of the straight legs of the heat exchanger tubes) into a position where the tube ends can be loosely gathered into a tightly grouped array and then locally deformed by compression, the opening for receiving the assembly can be kept relatively small so that during welding for securing the assembly (via a frame-like outer structure) to the end plate or the duct, degradation of the strength of the end plate or duct is minimal.

In an essential and important aspect of the present invention the braze alloy or filler is deposited on the mating faces to be joined prior to the collection and compressing of the tube ends by the frame. In this manner, the braze alloy deposited, for example, as a paste can be uniformly spread over the local surface areas during the squeezing action and can be urged into any gaps remaining between the tube ends.

DETAILED DESCRIPTION OF A PREFERRED EMBODIMENT

Figure 1:
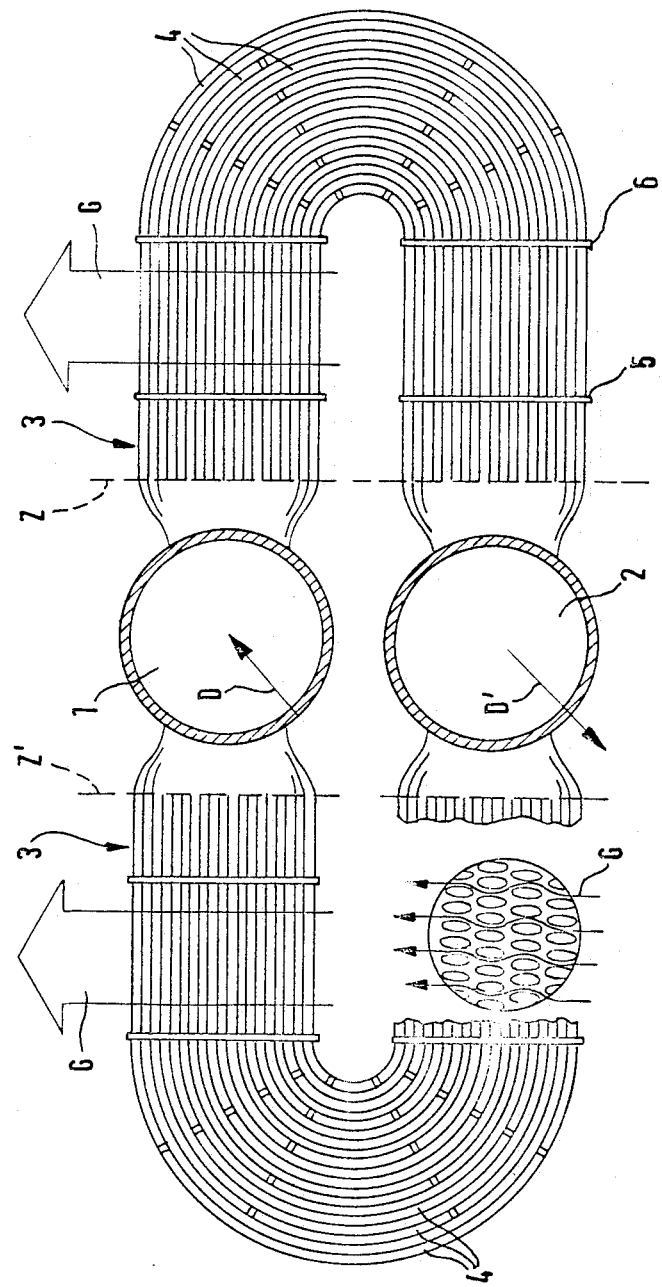
FIG. 1 is an elevational view, in section, partly broken away, of a cross-counterflow heat exchanger in which a portion of the heat exchange tubes is shown in transverse section.

FIG. 1 schematically illustrates a heat exchanger which comprises two ducts 1, 2 in parallel arrangement. A tube matrix 3 is connected to ducts 1, 2 at each side thereof to project laterally from the ducts in opposite directions into the path of flow G of hot gases. Each tube matrix is composed of U-shaped tubes having straight sections leading to the ducts and bend regions connecting the straight sections. The tubes of each matrix are of elliptical cross section as seen in the sectional view at the left-hand bottom portion of FIG. 1 so that the hot gas flow G travels along an undulating path through the spaces between the tubes. In this arrangement, the major axes of the elliptical section tubes are aligned in the direction of hot gas flow G.

In operation, compressed air D is supplied to the upper duct 1 and flows laterally into the matrix 3 through the straight sections of the tubes 4 and in the outer bend region of the matrix 3, the compressed air is reversed in direction and flows through the lower straight section of matrix 3 to the lower duct 2. In the course of flow through the tubes 4, the compressed air is heated by the hot gases G flowing on the outside of the tubes. The compressed air supplied to duct 2 is therefore heated and can be supplied in the direction of arrow D' to a suitable utilization means, such as the combustion chamber of a gas turbine engine. Spacers 5 and 6 are arranged along the tube matrix 3 to hold the tubes 4 in spaced relation.

The invention is directed to a method of manufacturing a strong, operationally safe and fluid-tight connection of the inner ends 7 (FIG. 2) of the tubes 4 of the heat exchanger matrix 3 to the respective ducts 1 and 2. The individual tubes 4 are arranged as shown in FIG. 3 in spaced relation at suitable intervals to achieve proper traversal of the hot gases around the tubes to effect heat exchange with the compressed air flowing within the tubes. Each tube 4 is provided with two distinct compressed air channels or passages 9, 10 separated from each other by a central cross web 8. The major axis A of each tube 4 is aligned with the direction of hot gas flow G whereas the minor axis B is aligned with the cross web and extends perpendicular to hot gas flow G.

Figure 2:
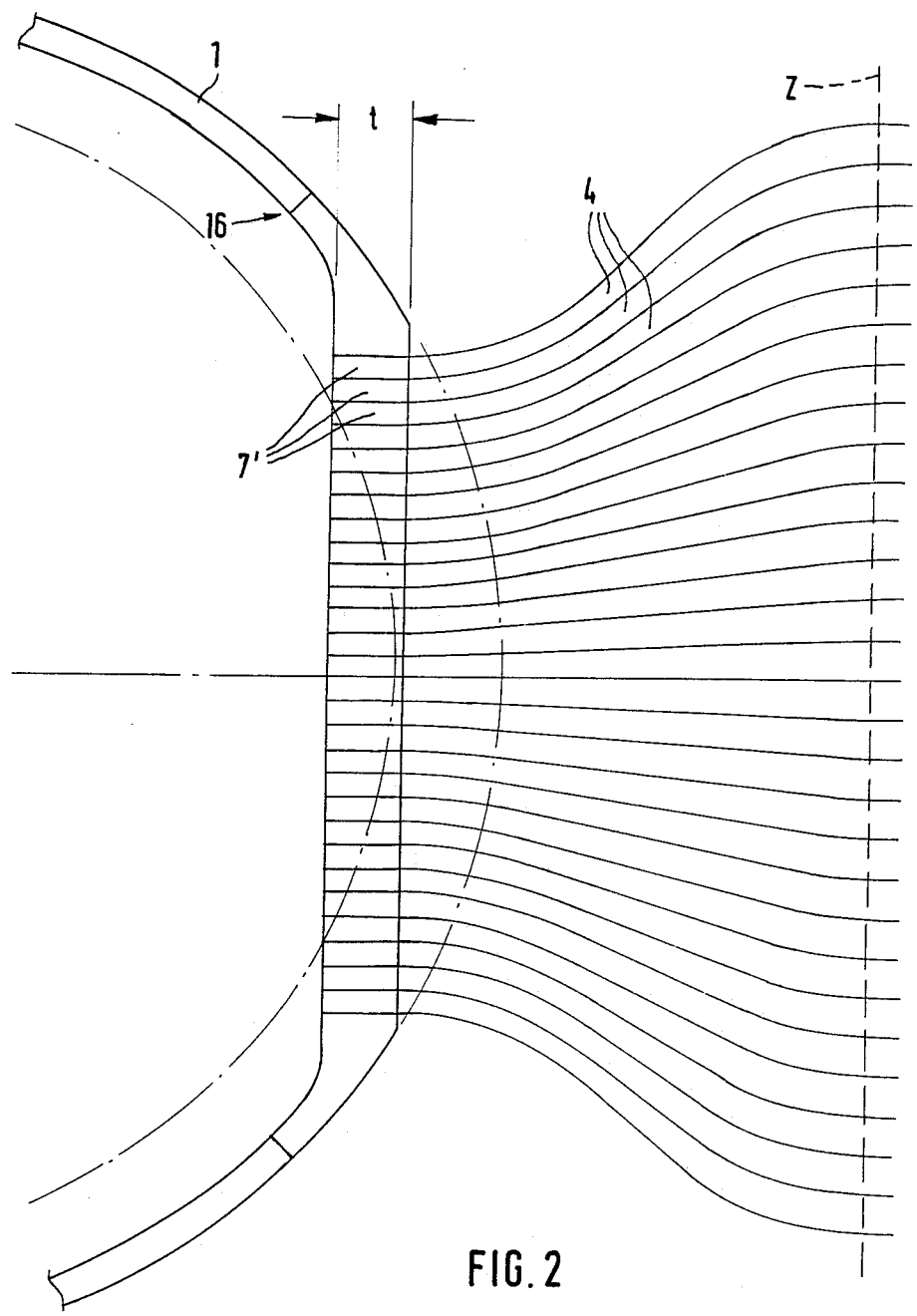
FIG. 2 is an elevational view, on enlarged scale, of a portion of the heat exchanger in FIG. 1 showing in detail the mounting of the ends of the heat exchange tubes to a duct.
Figure 3:
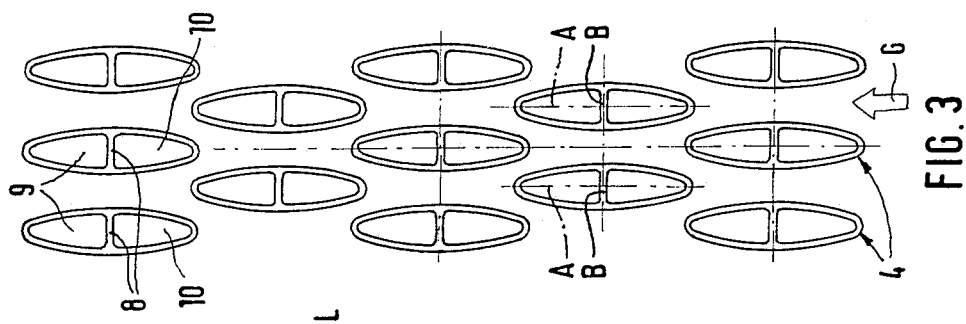
FIG. 3 is a section, on enlarged scale taken through the heat exchange tubes showing their normal spacing and arrangement in a tube matrix.
Figure 4:
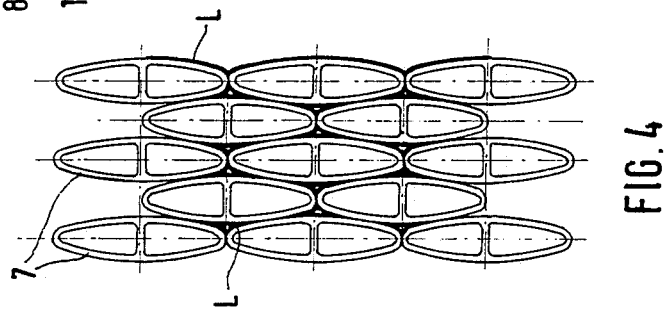
FIG. 4 is a sectional view taken through the ends of the heat exchanger tubes after the tubes have been brought together.

Having been arranged and retained as described above, the tubes 4 are bent from their respective straight sections of tube matrix 3 beginning at planes Z and Z' to intersect the ducts, 1, 2, at right angles as shown in FIG. 2. In this bent state, the ends 7 of the tubes can be loosely gathered or collected to be brought into surface contact with each other as shown in FIG. 4. In this embodiment, the ends 7 of the tubes 4 were coated with a brazing paste or alloy L after bending and prior to collection.

After the ends of the tubes have been brought together as shown in FIG. 4, the tube ends 7 are enclosed or encircled by frame elements 12, 13, 14 and 15 which serve as a shaping tool. When the elements 12, 13, 14 and 15 have been positioned on the tube ends, the frame elements are pressed together in the direction of arrows P, P1, P2, P3 such that the ends 7 of the tubes are deformed over substantially their entire surface areas, so that instead of an elliptical cross-sectional configuration, the tube ends are now shaped as shown at 7' in FIG. 5 into a configuration in which the tube ends 7' each have substantially triangular sections on either side of the respective cross web 8 so that they contact each other over substantially flat surfaces constituting substantially their entire surface area and with the brazing material L included between them. The compression forces P, P1, P2, P3 can be achieved using a suitable, adjustable compression press.

After the compression, the tube ends 7' and the frame elements 12, 13, 14, 15 are jointly brazed at high temperature, and the frame elements are brazed to each other and also to the immediately adjoining outer surfaces of the tube ends 7' to form a unified block assembly.

Thereafter the completed block assembly is welded, using the elements 12, 13, 14, 15 that were joined together to form a self-enclosed frame, to the wall sections of an opening 16 in the duct having the size and shape of the block assembly as shown, for example, for duct 1 in FIG. 2. Specifically, the assembled frame elements 12–15 have a rectangular outline and the opening 16 in the duct is also formed with a rectangular outline.

In FIG. 2, reference character t represents the length over which the brazing alloy or the braze alloy sheet extends on the tube ends 7'.

The high temperature brazing can be performed in a furnace, including the compression press, which operates as an additional retaining means for the frame elements in the furnace. The compression press is removed before the block aasembly is welded into the duct.

Figure 5:
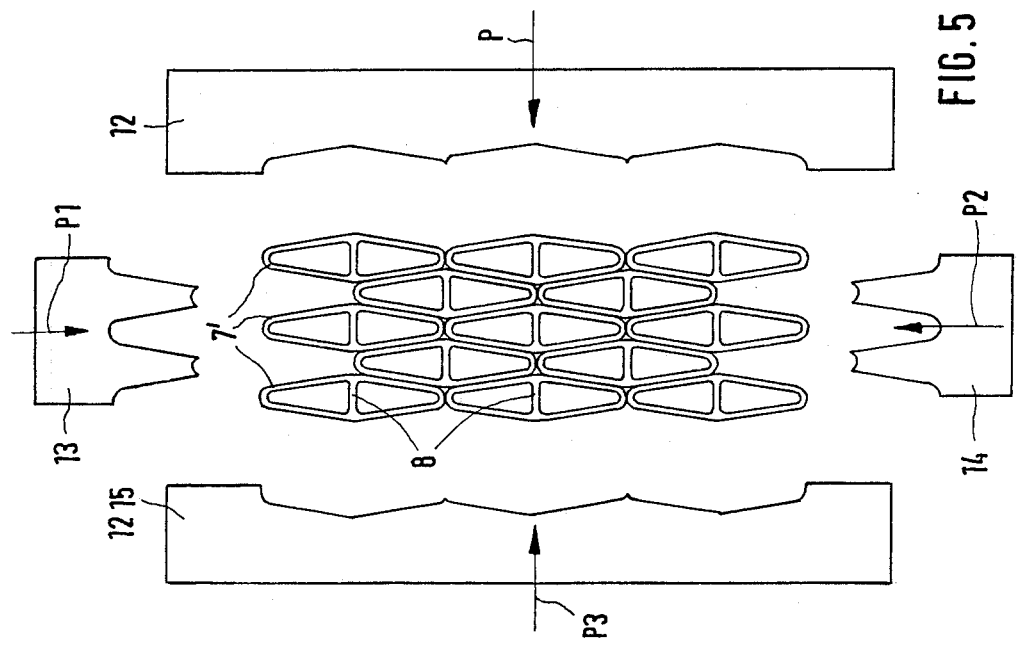
FIG. 5 is an exploded view showing frame elements which are applied against the tubes to deform the tubes by compression and become integrated with the deformed tubes to form a block assembly therewith.

As apparent from FIG. 5, the frame elements 13, 14 active in the direction of compression P1, P2, aligned in the direction of the major axes A of the elliptical tube ends 7, are formed with a profiled surface to engage the tube ends 7' and the adjacent frame parts 12, 15. The frame elements 12, 15 acting in the direction P, $P_3$ of the minor axis B of the elliptical tube ends 7 are formed on their inner surfaces as beveled forming tools adapted to the respective halves of the profile of the tube array.

In a further aspect of the present invention, brazing alloy can optionally be applied in the form of a paste or sheet before the frame is compressed, on those inner surfaces of the frame elements 12, 13, 14, 15 acting as forming tools, so that for operational safety these elements can be joined to the immediately adjoining outer surfaces of the joined tube ends in the furnace, rather than resorting to the previously mentioned application of brazing alloy to the outer surfaces of the collected tube ends (FIG. 4).

From the above, it is seen that the straight leg portions of the tube matrix 3 are joined to the tubular ducts 1, 2 by first bending the straight leg portions to bring the ends thereof into proximity to one another whereafter the ends are then loosely gathered to be brought into contact with one another. The ends of the tubes extend substantially perpendicular to the vertical axis of the duct as shown in FIG. 2. Thereafter, the frame elements 12–15 are applied around the collected ends of the tubes and compression force is applied to the tubes via the frame elements so that the ends of the tubes are deformed and come into surface contact with one another over substantially the entire surface area of the tubes. The tubes and frame elements are then heated to be united as the unified block assembly which is then inserted into the opening 16 of conforming shape in the heat exchanger duct, and joined to said duct in fluid-tight sealed relation thereat.

Although the invention has been disclosed in relation to a specific embodiment thereof, it will become apparent to those skilled in the art that numerous modifications and variations can be made within the scope and spirit of the invention as defined in the attached claims.

What is claimed is:

1. A method of securing the ends of heat exchange tubes to a heat exchanger duct, said method comprising
arranging heat exchange tubes in a matrix in which the tubes are of U-shape and form in the matrix straight leg portions connected by a bend region, the tubes in the straight leg portions being spaced from one another,
bending the straight leg portions of the tubes proximate the ends thereof to reduce the spacing of the tubes at said ends and bring the ends into proximity with one another,
encircling the ends of the tubes with frame elements,
applying compression force to said frame elements to deform the ends of the tubes so that the tubes contact one another over substantially the entire surfaces thereof,
heating the tubes and frame elements to unite the tubes to one another and to said frame elements to form a unified block assembly,
inserting said unified block assembly in an opening in a heat exchanger duct which has the same shape as the unified block assembly, and
joining said block assembly to said duct in fluid-tight sealed relation.

2. A method as claimed in claim 1 wherein the tubes have arcuate cross sections and are deformed by said frame elements when compression force is applied to said frame elements so that the tubes contact one another along flat surfaces.

3. A method as claimed in claim 2 wherein each tube has a cross web dividing the tube into two conveying channels, the deforming of the tubes producing two substantially triangular conveying channels.

4. A method as claimed in claim 1 wherein said tubes are united to one another by brazing.

5. A method as claimed in claim 4 comprising applying brazing material to the surfaces of the tubes before bending the tubes.

6. A method as claimed in claim 5 wherein the brazing material is a paste or braze sheet.

7. A method as claimed in claim 1 wherein said compression force is applied to said frame elements in two perpendicular directions.

8. A method as claimed in claim 1 wherein the frame elements are formed with a rectangular outline and the opening in the duct is also formed with a rectangular outline.

9. A method of securing in fluid-tight relation, the spaced ends of straight legs of heat exchange tubes of a U-shaped matrix to a wall of a fluid conveying member, said method comprising
bending the spaced ends of straight legs of heat exchange tubes of a U-shaped matrix to reduce the spacing between the ends of the tubes,
depositing a brazing alloy on the surfaces of the tubes to be joined together,
loosely gathering the ends of the tubes to bring said ends into contact along their surfaces,
encircling the loosely gathered tube ends with frame elements,
compressing the tube ends by said frame elements to deform the tube ends and cause the tube ends to come into contact with one another over substantially the entire surfaces thereof,
heating the tube ends to braze the same together and to unite the tube ends with the frame elements as a unified block assembly,
forming in a wall of a fluid conveying member an opening conforming in shape to the unified block assembly, inserting said unified block assembly into the opening in the wall of the fluid conveying member, and joining said unified block assembly to said wall in sealed relation.

10. A method as claimed in claim 9 wherein the compression of the tube ends flattens the tube ends.

11. A method as claimed in claim 9 wherein the brazing alloy is applied in the form of a paste or sheet.

12. A method as claimed in claim 9 wherein the brazing alloy is applied to the frame elements before the frame elements compress the tube ends.

13. A method as claimed in claim 9 wherein said frame elements apply compressive forces to the tube ends in two different directions.

14. A method as claimed in claim 13 wherein the two directions are at right angles.

15. A method as claimed in claim 9 wherein each tube is of elliptical cross section and has a cross web dividing the tube into two channels, the compressing of the tube ends producing an essentially triangular cross-section of each tube on each side of the cross web so that the tube ends come into contact with one another along planar surfaces.

* * * * *